United States Patent [19]

Morduchowitz

[11] 3,964,954
[45] June 22, 1976

[54] METHOD OF BONDING UTILIZING IMIDE ESTER DERIVATIVES OF ETHENE MALEIC ANHYDRIDE COPOLYMERS

[75] Inventor: Abraham Morduchowitz, Monsey, N.Y.

[73] Assignee: Texaco Inc., New York, N.Y.

[22] Filed: May 31, 9173

[21] Appl. No.: 365,647

Related U.S. Application Data

[62] Division of Ser. No. 102,539, Dec. 29, 1970, Pat. No. 3,810,276.

[52] U.S. Cl.............. 156/331; 260/33.6 UA; 526/310; 428/435; 428/458; 428/474; 428/476
[51] Int. Cl.² ............ C09J 5/00; B32B 27/34; B32B 17/10; B32B 15/08
[58] Field of Search ........... 117/70, 78, 130, 136, 117/129, 279, 262, 324, 328, 329, 336, 154, 155, 156, 82; 156/331; 161/227; 260/33.6 UA, 78.5 B, 78.5 T; 428/435, 458, 474, 476

[56] References Cited
UNITED STATES PATENTS

| | | | |
|---|---|---|---|
| 2,977,334 | 3/1961 | Zopf et al. | 260/27 R |
| 3,576,691 | 4/1971 | Meyers | 156/309 |
| 3,620,878 | 11/1971 | Guthrie | 156/309 |

*Primary Examiner*—Douglas J. Drummond
*Assistant Examiner*—Robert A. Dawson
*Attorney, Agent, or Firm*—T. H. Whaley; C. G. Ries; William E. McNulty

[57] ABSTRACT

Imide - ester derivatives of ethene - maleic anhydride copolymers are prepared in a two step reaction. These derivatives are useful as adhesives and protective coatings.

5 Claims, No Drawings

METHOD OF BONDING UTILIZING IMIDE ESTER DERIVATIVES OF ETHENE MALEIC ANHYDRIDE COPOLYMERS

This is a division of application Ser. No. 102,539, filed Dec. 29, 1970 and now U.S. Pat. No. 3,810,276.

BACKGROUND OF THE INVENTION

This invention relates to imide-ester copolymer derivatives, their preparation and use. In particular, this invention relates to imide-ester copolymers of ethene-maleic anhydride copolymers, their preparation and use.

Polymers and copolymers have a variety of uses, including use as protective coatings and as adhesives. Epoxy resins, for example, have excellent adhesion properties producing a strong bond but the layer of epoxy resin is not clear and transparent which would be a useful property, particularly if the surface or surfaces to which it is adhering is transparent.

Resins which are useful as protective coatings and adhesives, particularly those producing a transparent bond are most desirable and it is the purpose of this invention to provide such a material.

SUMMARY OF THE INVENTION

Broadly, our invention is directed to imide-ester derivatives of ethene-maleic anhydride copolymers, their preparation and use as protective coatings and adhesives. In a two step reaction process, a 1:1 ethene-maleic anhydride linear copolymer is reacted with an aliphatic alcohol and then further reacted, catalytically, with an amino compound. These imide-ester derivatives find utility as protective coatings and form a transparent bond when utilized as an adhesive.

DESCRIPTION OF THE PREFERRED EMBODIMENTS

Broadly, I have found that an imide-ester copolymer derivative prepared in a two step reaction process has particular utility as a protective coating and an adhesive.

The process for preparing these derivatives comprises:

a. reacting together under refluxing conditions a 1:1 linear copolymer of ethene and maleic anhydride having a molecular weight between about 10,000 and 25,000 dissolved in a hydrocarbon solvent and an alcohol selected from the group consisting of $C_{8-20}$ saturated aliphatic alcohols, $C_{8-20}$ unsaturated aliphatic alcohols and mixtures thereof, b. adding to the reaction mixture of step (a) an amino compound selected from the group consisting of N-($C_{8-20}$)alkyl-1,3-diaminopropane, N-($C_{8-20}$)alkenyl-1,3-diaminopropane, $C_{8-20}$ alkylamine, $C_{8-20}$ alkenylamine and mixtures thereof, and a catalyst comprising a strong organo-inorganic acid, c. reacting under refluxing conditions the reaction mixture of step (b), and d. recovering from the reaction mixture, an imide-ester derivative of the ethene-maleic anhydride copolymer.

In accordance with this invention the copolymer derivatives are prepared in a two step reaction wherein the active ingredients comprise an ethene-maleic anhydride copolymer, an alcohol and an amino compound. The useful copolymers are linear copolymers of ethene and maleic anhydride having an average molecular weight between about 10,000 and 25,000, particularly an average molecular weight between about 15,000 and 20,000. These copolymers have the following recurring copolymeric unit structure:

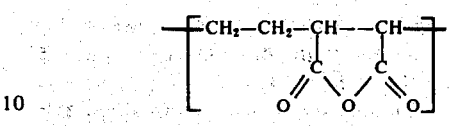

When referring herein to a mole of the copolymer, I mean a "mole" or the formula weight of this recurring copolymeric unit.

The alcohols which I find useful are the $C_{8-20}$ saturated aliphatic alcohols, the $C_{8-20}$ unsaturated aliphatic alcohols and mixtures thereof, particularly dodecanol, tetradecanol, hexadecanol and octadecanol, with 1-dodecanol being particularly preferred.

The useful amino compounds include both amines and diamines, although the diamines disclosed herein are preferred. The useful amines include $C_{8-20}$ alkyl primary amines, $C_{8-20}$ alkenyl primary amine and mixtures thereof. Examples of these include 1-aminooctane, 1-aminodecane, 1-aminododecane, 1-aminotetradecane, 1-aminohexadecane 1-aminooctadecane and 1-aminooctadecene. They are available as mixtures of two, three or more of these primary amines and are marketed by Armour & Company under the tradename "Armeen." The preferred amino compounds are the diamines including N-($C_{8-20}$)-alkyl-1,3-diaminopropane, N-($C_{8-20}$)-alkenyl-1,3-diaminopropane and mixtures thereof. Examples of these useful diamines include the octyl, decyl, dodecyl, tetradecyl, hexadecyl, octadecyl and octadecenyl 1,3-diaminopropanes. These products are available as mixtures of four or more of these diamines and sold by Armour & Company under the tradename "Duomeen." A particularly preferred commercial product is Duomeen T which is a mixture of 2% of the tetradecyl, 24% of the hexadecyl, 28% of the octadecyl and 46% of the octadecenyl, 1,3-diaminopropanes.

I find that the mole ratio of the reactants can vary between certain limits while still yielding useful imide-ester derivatives of the copolymer. The mole ratio of the copolymer, i.e., the recurring copolymeric unit, to alcohol to amino compound should be between about 1:1½:¼ and 1:½:¾ with a preferred mole ratio being about 1:1:½.

In the second reaction step of the process wherein the amino compound is reacted, a catalyst is required to effect the reaction. Useful catalysts include the strong organo-inorganic acids such as p-toluenesulfonic acid and benzenesulfonic acid. 1-2 wt.% of catalyst, based on the reactants, will catalize the reactions.

The process is performed and the reaction mechanism is postulated to be as follows: The copolymer is dissolved in a suitable hydrocarbon solvent such as xylene to which is then added the alcohol. This mixture is heated under refluxing conditions while removing water of formation which forms to complete the reaction, with the reaction taking place at the anhydride functions of the copolymer. A hemi-ester results from this initial step i.e., esters and acids are formed at the anhydride sites depending on the ratio of reactants used. The next step involves the addition of catalyst and the amino compound to the reaction mixture and a continuation of the heating under refluxing conditions with the removal of water of formation as it forms. In this step the imide functions form at some of the acid and ester sites to produce a copolymer derivative having imide and ester functions at what were formerly anhydride sites.

It should be understood that since mixtures of the alcohols and the amino compounds may be employed and a copolymer serves as the backbone for the anhydride sites and the reactions will occur randomly on the copolymer, the possible compounds and isomers thereof which are formed are quite numerous and oftentimes difficult, if not impossible, to catalogue completely. However, typical reactions can be postulated and an average or typical compound can be described although this does not thereby preclude the formation of compounds other than, or isomers of, that described. Certainly, where mixtures of reactants are employed the possibilities are limitless. Further, varying the mole ratio of the reactants can change the number and type of groups formed on the copolymer backbone. However it is possible to describe an "average" or "typical" number of imide and ester functions which are found per four recurring copolymeric units of the product of my process. This is set forth in Table I below for the useful mole ratio range of reactants as well as the preferred mole ratio.

| Mole Ratio of Reactants | | | No. of Substituent Groups Per Four Recurring Copolymeric Units | |
|---|---|---|---|---|
| Copolymer | Alcohol | Amine | Imide | Ester |
| 1 | 1½ | ¼ | 1 | 6 |
| 1 | 1 | ½ | 2 | 4 |
| 1 | ½ | ¾ | 3 | 2 |

These imide-ester derivatives of ethene-maleic anhydride copolymers exhibit properties which make them useful as adhesives and protective coatings. As an adhesive, these derivatives will tightly affix both similar and dissimilar materials to each other. Both porous and non-porous, metal and non-metal materials may be affixed together. The types of materials which can be adhered together include cardboard, paper, wood, ceramics, plastics, glass and metals, for example, brass, copper, steel and aluminum. The transparent quality of these derivatives makes them particularly attractive for bonding transparent materials such as glass to each other or to non-transparent materials.

As a coating, these materials form a thin, continuous transparent film to protect the surfaces of the metals and non-metals listed above. These films may be formed by dipping the material to be coated in a solution of the derivative with a volatile solvent, permitting the excess to drain off and allowing the solvent to evaporate.

The following exemplify my invention.

EXAMPLE I

An imide-ester derivative of an ethene-maleic anhydride linear copolymer was prepared.

63 grams (about 0.5 moles) of an ethene-maleic anhydride copolymer having an average molecular weight of 15,000 to 20,000 and sold by Monsanto Co. under the tradename DX-840 was dissolved in 500 ml. of xylene. 140 grams of dodecanol (about 0.75 moles) were added to this mixture and refluxed for four hours while water of formation was removed. Then 3 grams of p-toluenesulfonic acid and 35 grams (about 0.125 moles) of Duomeen T were added. This is a tradename of a product of Armour & Co. and is a mixture of N-alkyl-1,3 diaminopropanes and N-alkenyl-1,3 diaminopropane. The alkyl and alkenyl groups are derivatives of tallow acids and consist mainly of $C_{16}$ and $C_{18}$ normal saturated hydrocarbon chains and $C_{18}$ mono-unsaturated chains.

The entire reaction mixture was heated under refluxing conditions overnight (15 hours). Water of formation was removed during refluxing. The product was precipitated with 1500 ml. of methanol, the liquid was decanted, and the polymer was recovered and dried under vacuum at 250°F. Infra-red analysis of the polymer product identified imide and ester substituents on the copolymer.

EXAMPLE II

The adhesive properties of these derivatives were demonstrated.

A 25% benzene solution of the copolymer derivative of Example I was prepared. A few drops of the solution were placed between a series of materials and held together at ambient temeperature overnight. In all instances the materials were overlapped and the contact area was approximately ½ × 1 inch.

The results are shown in Table II below.

TABLE II

| MATERIALS | RESULTS |
|---|---|
| 2 strips of cardboard | Stuck fast together |
| Glass strip and brass strip | Stuck tightly together, transparent joint |
| 2 aluminum strips | Stuck fast together but could be pried apart by hand |
| 2 wooden strips | Stuck fast together but could be pried apart by hand |
| 2 steel strips | Stuck fast together and could not be pried apart by hand |
| 2 glass slides | Stuck fast together and could not be pried apart by hand. Perfectly clear and transparent joint |

EXAMPLE III

These derivatives were evaluated as protective films.

Portions of brass, aluminum, steel and glass strips were dipped into a 25% benzene solution of the copolymer derivative of Example I. The strips were removed from the solution, the excess permitted to drain off and the remaining film allowed to dry at room temperature. The strips were then placed in beakers containing 8% hydrochloric acid. In a few minutes the uncoated portions of the metal strips were corroded while all coated portions were unchanged.

I claim:

1. A method of adhering paper, cardboard, ceramic, glass, plastics and metals to themselves or each other which comprises applying to adjacent surfaces of said materials an imide-ester derivative of an ethene-maleic anhydride copolymer and maintaining said surfaces together whereby an adherent bond forms, said imide-ester derivative prepared by a process which comprises:

a. reacting together under refluxing conditions a 1:1 linear copolymer of ethene and maleic anhydride having an average molecular weight between about 10,000 and 25,000 dissolved in a hydrocarbon solvent and an alcohol selected from the group consisting of $C_{8-20}$ saturated aliphatic alcohols, $C_{8-20}$ unsaturated aliphatic alcohols and mixtures thereof, b. adding to the reaction mixture of step (a) an amino compound selected from the group consisting of N-($C_{8-20}$) alkyl-1,3-diaminopropane, N-($C_{8-20}$) alkenyl-1,3-diaminopropane, $C_{8-20}$ alkylamine, $C_{8-20}$ alkenylamine and mixtures thereof and a catalyst comprising a strong organoinorganic acid, c. reacting under refluxing conditions the mixture of step (b), d. removing water of formation formed in step (c) from the reaction mixture, and e. recovering from the reaction mixture, an imide-ester derivative of the ethene-maleic anhydride copolymer.

2. A method according to claim 1 wherein the amino compound of step (b) is selected from the group consisting of N-($C_{8-20}$) alkyl-1-3-diaminopropane, N-($C_{8-20}$) alkenyl-1,3-diaminopropane and mixtures thereof.

3. A method according to claim 1 wherein the copolymer has an average molecular weight of between about 15,000 and 20,000, the alcohol is 1-dodecanol, the amino compound is a mixture of N-($C_{14-18}$) alkyl-1,3-diaminopropane and N-($C_{18}$) alkenyl 1,3-diaminopropane, the solvent is xylene and the catalyst in p-toluene sulfonic acid.

4. A method according to claim 1 wherein the mole ratio of the recurring copolymeric unit:alcohol:amino compound is between about 1:1 ½:¼ and 1:½:¾.

5. A method according to claim 3 wherein the mole ratio of the recurring copolymeric unit:alcohol:amino compound is about 1:1:½.

* * * * *